P. SALIAS.
EYEGLASSES.
APPLICATION FILED MAR. 5, 1915.
1,144,068.
Patented June 22, 1915.
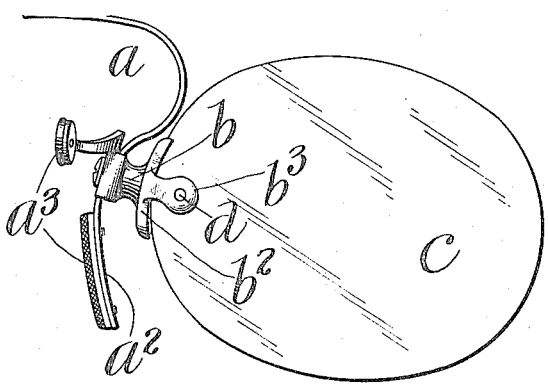
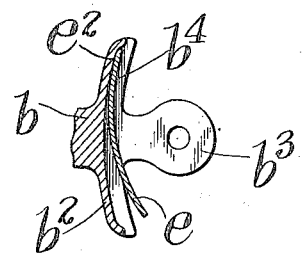
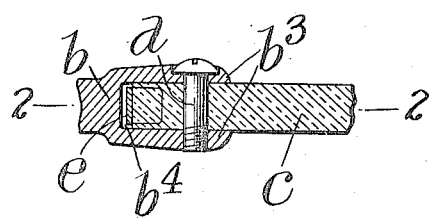
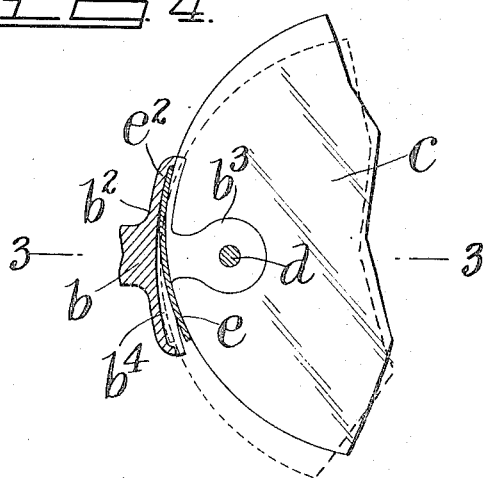
Witnesses:
H. E. Thompson
C. Mulreany
Inventor
Philip Salias,
By his Attorneys
Edgar Tate & Co.

UNITED STATES PATENT OFFICE.

PHILIP SALIAS, OF WHITESTONE, NEW YORK.

EYEGLASSES.

1,144,068.  Specification of Letters Patent.  Patented June 22, 1915.

Application filed March 5, 1915. Serial No. 12,234.

*To all whom it may concern:*

Be it known that I, PHILIP SALIAS, a citizen of the United States, and residing at Whitestone, Long Island, in the county of Queens and State of New York, have invented certain new and useful Improvements in Eyeglasses, of which the following is a specification, such as will enable those skilled in the art to which it appertains to make and use the same.

This invention relates to eyeglasses, and the object thereof is to provide devices of this class with improved means for holding the lenses in proper position and for preventing them from working loose, and sagging or drooping when loose.

My invention is applicable to eyeglasses worn on the nose and also to what are known as spectacles, but in the accompanying drawing I have shown the improvement applied to nose glasses only.

The invention is fully disclosed in the following specification, of which the accompanying drawing forms a part, in which the separate parts of my improvement are designated by suitable reference characters in each of the views, and in which:—

Figure 1 is a view of one-half of a pair of eyeglasses and showing my improvement; Fig. 2 a partial section on the line 2—2 of Fig. 3, but omitting the lens; Fig. 3 a section on the line 3—3 of Fig. 4; and, Fig. 4 a view similar to Fig. 2 but showing the lens.

In the accompanying drawing all the figures are enlarged and Figs. 2 to 4 inclusive are much enlarged over Fig. 1.

In Fig. 1 of the accompanying drawing, I have shown at $a$ one-half, or one side portion of a pair of eyeglasses of the class usually worn upon the nose and involving the usual side spring arm $a^2$ having nose clips $a^3$ and provided with the usual lens securing stud $b$ having the usual strap piece $b^2$ provided with parallel projecting jaws $b^3$ between which the lens $c$ is secured by a pin or screw $d$ passed therethrough and through said jaws. It is a well known fact that in devices of this class the lenses when secured in position in the usual manner continuously work loose and sag or droop, and this effects the operation or use of glasses and renders the same defective, and also renders it necessary to frequently secure the lenses in position by tightening the pin or screw $d$ and this frequently breaks the lenses.

In the practice of my invention, I secure in the top and in the front faces of the straps $b^2$, only one of which is shown, springs $e$ which extend downwardly between the jaws $b^3$, and which are preferably countersunk in the front faces of the straps $b^2$ and the normal position of these springs $e$ before the lenses $c$ are secured in place is that shown in full lines in Figs. 2 and 4 in which the lower ends of said springs extend outwardly.

In the operation of securing the lenses in place the springs $e$ are forced backwardly, as shown in Fig. 1, and the lower ends of said springs always operate to raise the lenses and hold them in the position shown in full lines in Fig. 1, and these springs also serve to prevent any movement of the lenses on the pivot pins or screws $d$, and if for any reason, as a result of use, or otherwise, the lenses should work loose at any time, the springs $e$ will always serve to hold them in proper position and prevent them from sagging or drooping as shown in dotted lines in Fig. 4. The strap $b^2$ shown in the accompanying drawing is provided in its front face with a longitudinal groove or recess $b^4$ in the upper end portion of which the spring $e$ is secured at $e^2$ in any preferred way, and this retains the strap in its original form and securely holds the spring which is concealed or nearly so when in use and prevents the spring from being bent laterally or misplaced in any way.

Having fully described my invention, what I claim as new and desire to secure by Letters Patent, is:—

1. An eyeglass strap, the front or outer side of which is provided with a longitudinal groove, a spring secured in the upper end of said groove and extending downwardly and longitudinally therethrough and the lower end of which is free.

2. An eyeglass strap, the front or outer side of which is provided with a longitudinal groove, a spring secured in the upper end of said groove and extending downwardly and longitudinally therethrough and the lower end of which is free and bent outwardly.

3. The combination with the lens holding stud of a pair of eyeglasses having the usual strap and projecting jaws between which the lens is secured, said strap being provided in its front or outer face with a longitudinal groove, of a spring secured in the upper end of said groove and extending downwardly therethrough and on which the lens bears and the lower end of which is bent outwardly.

4. An eyeglass strap having the usual projecting jaws between which the lens is secured, said strap being provided in the face thereof with a longitudinal groove, and a spring secured in said groove and bearing on the adjacent edge portion of said lens and by which said lens is prevented from drooping.

In testimony that I claim the foregoing as my invention I have signed my name in presence of the subscribing witnesses this 2nd day of March, 1915.

PHILIP SALIAS.

Witnesses:
JAMES M. MCKENNA,
CHARLES S. COLDEN.